United States Patent [19]

Raccanelli et al.

[11] 4,222,082
[45] Sep. 9, 1980

[54] MAGNETIC DISK APPARATUS WITH AUTOMATIC FAST HEAD ADVANCE

[75] Inventors: Mirco Raccanelli, Ivrea; Carlo Romano, Montalto Dora, both of Italy

[73] Assignee: Inc. C. Olivetti & C., S.p.A., Ivrea, Italy

[21] Appl. No.: 915,548

[22] Filed: Jun. 14, 1978

[30] Foreign Application Priority Data
Jun. 20, 1977 [IT] Italy ............................. 68422 A/77

[51] Int. Cl.² ............................................ G11B 21/12
[52] U.S. Cl. ...................................................... 360/75
[58] Field of Search ........................... 360/86, 107, 75

[56] References Cited
U.S. PATENT DOCUMENTS
3,060,940  10/1962  Fujimoto ............................... 360/86

Primary Examiner—Robert S. Tupper
Attorney, Agent, or Firm—Schuyler, Birch, McKie & Beckett

[57] ABSTRACT

In an apparatus for recording binary information on a flexible magnetic disk, a plate, is provided connected to an electric motor, for rotating the disk, and a spiral guide is formed on a first surface of the plate for moving a recording head radially with respect to the disk, in synchronism with the rotation of the plate and the disk. The improvement comprises an electronic circuit, which controls the angular speed of the motor, and quickly accelerates the motor, when the last binary information has been recorded on the disk, for shortening the time taken by the head to return to the rest position.

3 Claims, 1 Drawing Figure

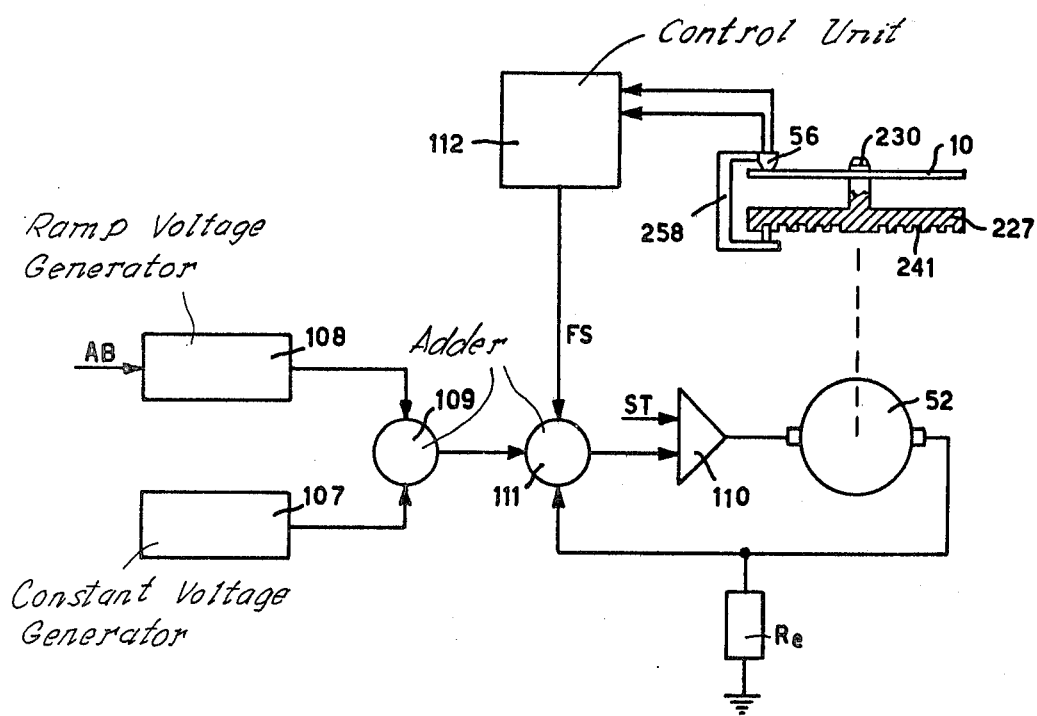

MAGNETIC DISK APPARATUS WITH AUTOMATIC FAST HEAD ADVANCE

BACKGROUND OF THE INVENTION

The present invention relates to an improvement to an apparatus for recording binary information on a flexible magnetic disk, comprising a rotatable plate having a hub connected with an electric motor for rotating the plate, a recording head, a movable arm having an end on which the head is mounted, and a spiral guide formed on the plate and cooperating with said movable arm for moving the recording head radially with respect to the disk, in synchronism with the rotation of the same plate.

An apparatus of this type is described in detail in copending application Ser. No. 881,656 filed on Feb. 27, 1978, assigned to the assignee of the present invention. In this cited apparatus, the motor is supplied with a variable voltage in manner that the angular speed of the disk increases during the radial movement of the recording head from the periphery towards the center of the disk, to maintain the relative speed between the head and the head close to a nominal value.

SUMMARY OF THE INVENTION

The principal object of the improvement according to the present invention is to reduce to a minimum value the time of return of the recording head to the rest position, after the recording of the last binary information on the disk.

In accordance with this object, the improvement comprises a control unit connected to the recording head for controlling the recording of the binary information and for generating a signal indicative of a last binary information recorded on the disk, and accelerating means connected to the electric motor and with the control unit for accelerating the rotation of the motor when said signal is generated.

BRIEF DESCRIPTION OF THE DRAWING

The invention will be described in more detail, by way of example, with reference to the accompanying drawing, which is a schematic view of an apparatus embodying the improvement of the invention.

DESCRIPTION OF A PREFERRED EMBODIMENT OF THE INVENTION

The apparatus according to the present invention comprises a plate 227, shaped so as to have a top hub 230, which cooperates with a flexible magnetic disk 10, for the rotation thereof. The disk 10 is of small dimensions, for example of the type described in the copending application Ser. No. 881,656 filed on Feb. 27, 1978, assigned to the assignee of the present invention.

A recording head 56 is mounted at the end of an arm 258, which cooperates with a spiral guide 241, formed on the plate 227. The guide 241 moves radially the arm 258 and the head 56, during the rotation of the plate 227.

The plate 227 is connected, in a known manner, to an electric motor 52, which is supplied by a constant voltage generator 107 and a ramp voltage generator 108 which in turn have their outputs connected to the inputs of a first adder 109. The output of the adder 109 is connected to an input of a second adder 111.

The adder 111 has an output connected to one input of an amplifier 110 having its output connected to one terminal of the motor 52. The other terminal of the motor 52 is earthed through a resistor $R_e$ having a value equal to the internal resistance of the motor 52. A positive feedback signal is collected at one end of the resistor $R_e$ and is sent to an input of the second adder 111 to be added algebraically to the signal arriving from the adder 109. A start/stop signal ST for the motor 52 arrives at a second input of the amplifier 110, this signal enabling the amplifier. An enabling signal AB is sent to the linear ramp voltage generator 108.

Moreover, a control unit 112 of known type is connected to the magnetic head 56 and controls the writing and/or reading of binary information thereby on the disk 10. Normally this binary information begins with a leader character and terminates with an end of record character. The control unit 112 generates a signal FS when the end of record character is written or read by the magnetic head 56 and the signal FS is sent to a third input of the adder 111. An example of a unit which generates a signal at the end of record is fully described in the U.S. Pat. No. 3,399,394, issued Aug. 27, 1968.

The apparatus hereinbefore described operates in the following manner. In the inoperative position, the plate 227 is stationary and the arm 258 is disposed shifted towards the periphery of the disk 10 at the beginning of the spiral guide 241. The logical signals AB and ST are at 0 level.

In order to write and/or read binary information on the disk 10, the signal ST is brought to 1 level; in this way, the generator 107 supplies a predetermined constant voltage to the motor 52, thus setting it in motion. In order to maintain the relative speed between the magnetic head 56 and the disk 10 substantially constant, the motor 52 is caused to accelerate by bringing the signal AB to 1 level and thus also supplying to the motor the voltage of the ramp generator 108.

When the magnetic head 56 has written and/or read the last bit character of binary information, irrespective of the position reached by the head 56 with respect to the disk 10, the control unit 112, which also controls the motor 52, generates the signal FS which assists in further accelerating the motor 52. In this way, the time taken by the head 56 to complete its travel into the proximity of the center of the disk becomes very short. The head then quickly returns to the inoperative position in a known manner, for example under the action of return means, of the type described in the cited copending application Ser. No. 881,656.

More particularly, the voltage supplied by the signal FS accelerates the motor 52 about threefold with respect to its nominal speed. In this way, the time for processing a disk is reduced, above all in those cases in which the signal FS is generated after only a few revolutions of the disk. When the head 56 has returned to the inoperative position, the motor stops, by bringing the signal ST back to 0 level.

What we claim is:

1. In an apparatus for recording binary information on a flexible magnetic disk comprising a rotatable plate, means mounting said disk on said plate for rotation with said plate, an electric motor having means for rotating said plate, a recording head, a movable arm having an end on which said head is mounted, a spiral guide carried by said plate and co-operating with said movable arm for radially moving said head from the periphery towards the center of said disk to synchronize the movement of said head with the rotation of said disk, and return means for quickly returning said head from the center towards the periphery of said disk, the improvement comprising:

control means connected to said head for controlling the recording of said binary information and for generating a signal indicative of a last binary information recorded on said disk, and accelerating means connected to said motor and with said control means for accelerating the rotation of said motor when said signal is generated, to reduce the time for moving said head towards the center of said disk.

2. An apparatus according to claim 1, wherein said accelerating means comprises a constant voltage generator and a ramp voltage generator, both connected to a first adder having an output, and a second adder, having a first input connected to the output of said first adder and a second input connected to said control unit, said second adder having an output connected to said motor.

3. An apparatus for writing and/or reading binary information on a flexible magnetic disk along a predetermined spiral path, comprising an electric motor for rotating said disk, means supporting said disk for rotation thereof by said motor, a recording head, driving means for radially moving said head from the periphery towards the center of said disk in synchronism with the rotation of said disk, in manner that said head is constantly positioned on said predetermined spiral path, return means for quickly returning said head from the center towards the periphery of said disk along a return path shorter than said predetermined spiral path, and circuit means for accelerating the rotation of said motor when a last binary information is written and/or read by said head, to reduce the time for moving said head along said spiral path.

* * * * *